United States Patent [19]
Lurois

[11] Patent Number: 5,316,062
[45] Date of Patent: May 31, 1994

[54] TIRE TREAD FOR HEAVY VEHICLES

[75] Inventor: Patrick Lurois, Greenville, S.C.

[73] Assignee: Compagnie Generale des Etablissements Michelin - Michelin & Cie, Ferrand Cedex, France

[21] Appl. No.: 787,588

[22] Filed: Nov. 4, 1991

[30] Foreign Application Priority Data

Nov. 15, 1990 [FR] France .................... 90 14343

[51] Int. Cl.$^5$ .............................. B60C 11/11
[52] U.S. Cl. ................ 152/209 R; 152/DIG. 3
[58] Field of Search .......... 152/209 R, 209 D, 209 B, 152/DIG. 3

[56] References Cited

U.S. PATENT DOCUMENTS

| 2,926,715 | 3/1960 | Constantakis | 152/209 R |
|---|---|---|---|
| 3,559,712 | 2/1971 | Verdier . | |
| 4,736,783 | 4/1988 | Motomura et al. | 152/209 R |
| 5,010,936 | 4/1991 | Numata et al. | 152/209 R |

FOREIGN PATENT DOCUMENTS

| 0235072 | 9/1987 | European Pat. Off. | 152/209 R |
|---|---|---|---|
| 0355636 | 2/1990 | European Pat. Off. . | |
| 0397639 | 11/1990 | European Pat. Off. . | |
| 0090406 | 4/1988 | Japan | 152/209 R |
| 0125410 | 5/1988 | Japan | 152/209 R |
| 0170105 | 7/1988 | Japan | 152/209 R |
| 0275406 | 11/1988 | Japan | 152/209 R |
| 2070504 | 3/1990 | Japan | 152/209 R |
| 2299909 | 12/1990 | Japan | 152/209 R |
| 1145459 | 3/1969 | United Kingdom | 152/209 R |

Primary Examiner—Michael W. Ball
Assistant Examiner—Nancy T. Krawczyk
Attorney, Agent, or Firm—Brumbaugh, Graves, Donohue & Raymond

[57] ABSTRACT

Tread for heavy vehicles with radial carcass comprising a plurality of circumferential rows of blocks (13) having incisions (15), defined by circumferential (10) and transverse (12) grooves, said blocks being connected to each other in circumferential direction by platforms 14) which are arranged in the transverse grooves (12) and the height of which increases from the center towards the edges of the tread, the depth of the incisions (15) decreasing from the center towards the edge of the tread and the density of the incisions being maximum in the central zone (Z) of the tread.

6 Claims, 2 Drawing Sheets

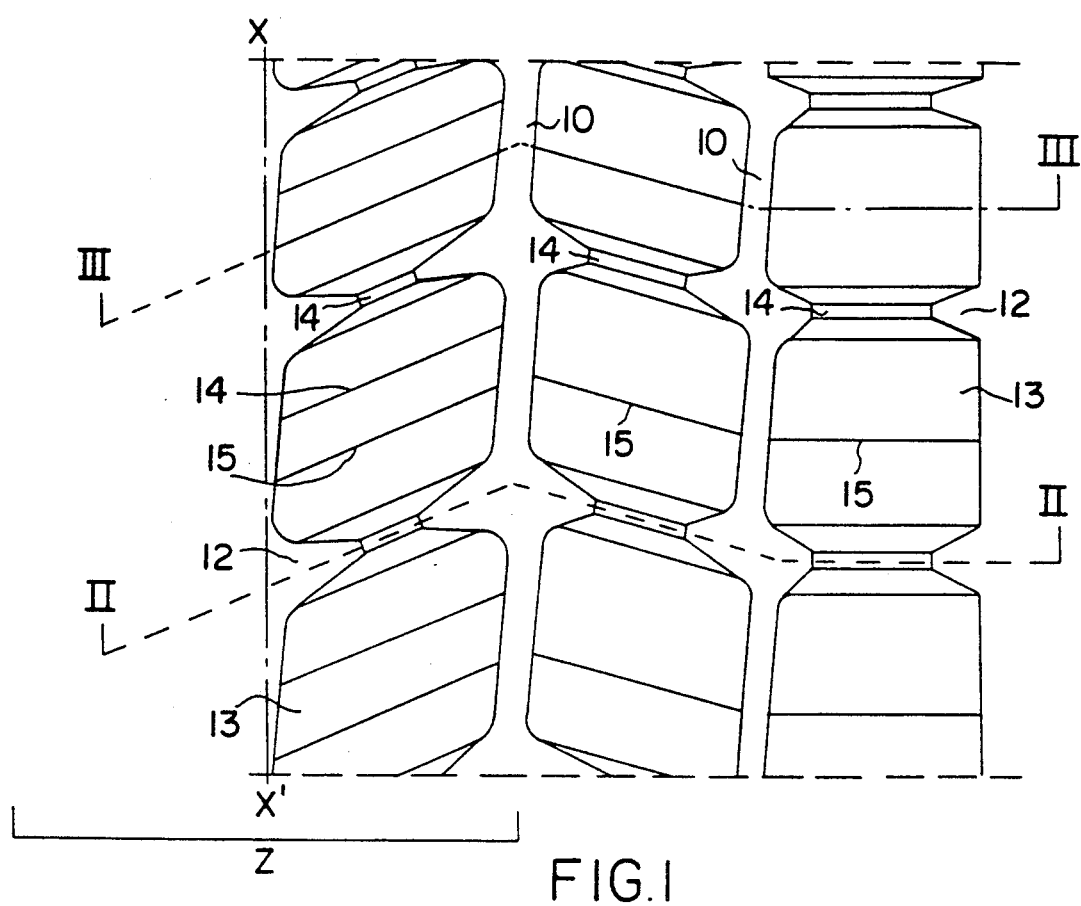
FIG.1
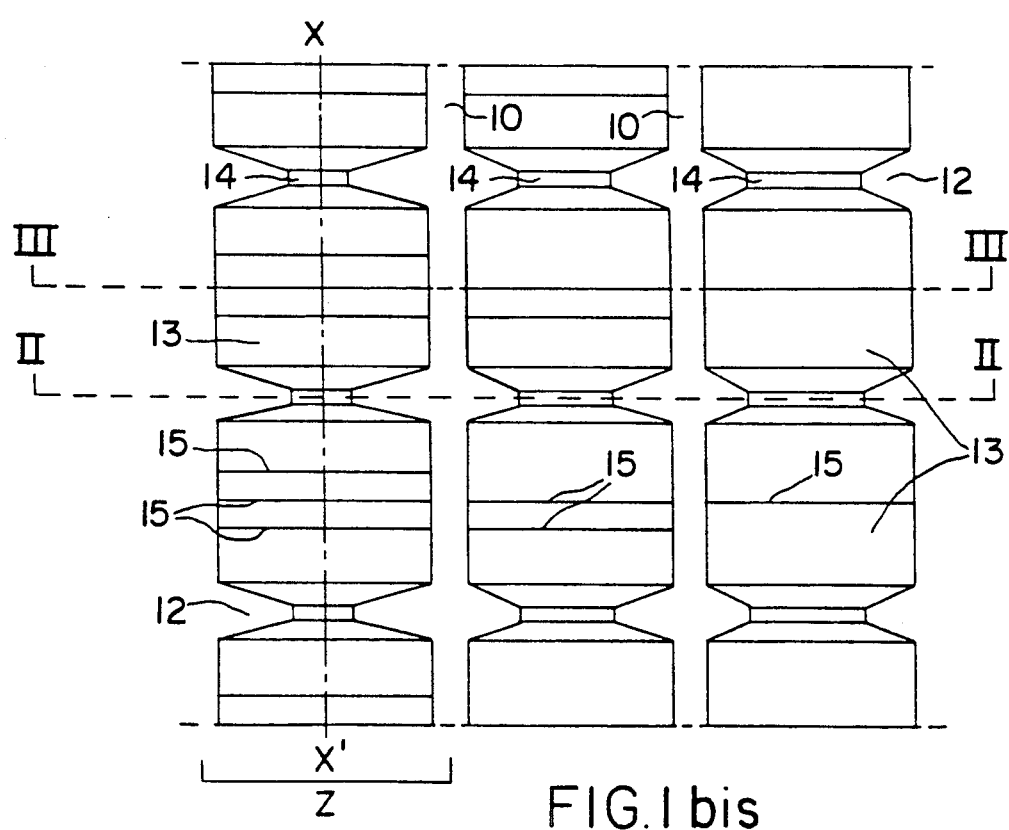
FIG.1 bis

TIRE TREAD FOR HEAVY VEHICLES

BACKGROUND OF THE INVENTION

The present invention relates to treads for radial carcass tires intended for heavy vehicles, more particularly buses.

Due to the very draconian conditions caused by the use of studded tires, it has appeared necessary, in order to avoid damage to the roads or even a total prohibition against the use of studded tires, to provide tires intended for heavy vehicles, and in particular buses, which are excellent in all weather, in all positions of the vehicle and, in particular, on the driving axles. It is well known that the tread of all-weather radial tires for heavy vehicles is generally formed of individual blocks arranged in several circumferential rows so as to provide excellent traction. However, such a tread rapidly leads to abnormal wear which may result in premature retirement of the tires due to the noise produced upon travel.

In order to overcome this drawback, U.S. Pat. No. 4,676,290 has proposed a tread formed of individual blocks with recesses on each of their circumferential edges, which are separated in circumferential direction by narrow grooves of generally transverse orientation which are of reduced depth as compared with those of the circumferential grooves and form platforms between the blocks in the circumferential direction. These identical platforms are present in all the rows of blocks with the exception of the side blocks of the tread. Such a solution has the drawback of offering only small driving traction on snow-covered ground.

It is furthermore known from British Patent 2 120 183 to improve the adherence of heavy vehicles on wet ground when they are under low load by using a tread formed of several rows of individual blocks present in the median zone and separated from each other in the circumferential direction by platforms arranged in narrow transverse grooves, the platforms in the vicinity of the median axis of the tread having, at least in the part close to the median axis, the smallest height and a greater height in the part directed towards the edges of the tread. This solution is no more satisfactory than the preceding one from the standpoint of adherence to snow-covered ground.

European Patent Application 355 636 describes a heavy-vehicle tire tread which retains its initial braking properties even after half-wear, which has, in the median zone of the said tread, fine incisions of a depth greater than those present in the side zones and a density less than the density of incisions present in the side zones.

SUMMARY OF THE INVENTION

The present invention is directed at obtaining a tread which is excellent in all weather and is particularly adapted to assure high adherence both on wet ground and on snow-covered ground and does not exhibit irregular wear or cracking of the rubber.

The tread of the invention, which comprises a plurality of grooves of generally circumferential orientation and a plurality of grooves of generally transverse orientation defining a plurality of rows of individual blocks some part of which rows are provided with fine incisions, connected with each other in the circumferential direction by platforms, is characterized by the fact that, from the center of the tread towards its edges and from one row of blocks to the next, the platforms are of increasing height and the incisions present in the blocks are of decreasing depth, their density being maximum in the center zone formed by the row or rows of blocks located on the median axis or on the two sides thereof.

If one considers a tread formed of rubber blocks defined by a plurality of circumferential and transverse grooves, the latter having platforms of rubber arranged between the rubber blocks connecting them in circumferential direction and if one designates, passing from the median axis towards each of the two edges of the tread, by $H_n$ the height of the blocks of row n in question of the successive circumferential rows of blocks with respect to the bottom of the grooves, by $h_n$ the height of the platforms present in the circumferential rows of row n in question, by $S_n$ the area of the walls of the blocks adjacent to the platforms of the circumferential rows of row n in question, by $s_n$ the area of the walls of the platforms adjacent to the walls of the blocks defining the transverse grooves of the circumferential rows of row n in question, by $P_n$ the depth of the incisions provided in the blocks of successive circumferential rows of row n in question, by $A_n$ the total area in each of the blocks of all of the incisions present in a block of a circumferential row of row n in question when more than one incision is present, embodiments of treads in accordance with the invention are obtained if the different parameters relative to the platforms and the incisions, in addition to their density in each of the circumferential rows, at the same time satisfy all of the following conditions, it being pointed out that the parameters of the circumferential rows of blocks are to be taken into consideration only as a function of the actual number and it being unimportant whether there are an even or uneven number of circumferential rows of blocks present:

in the case of treads having from 5 to 6 circumferential rows of blocks

| | | |
|---|---|---|
| a) h1 = 0 to 50% H1 | | (h3/H3) − (hs/H2) ≥ 20% |
| h2 = 45 to 75% H2 | with | |
| h3 = 70 to 100% H3 | | (h2/H2) − (h1/H1) ≥ 10% |
| b) s1 = 0 to 35% S1 | | (s3/S3) − (s2/S2) ≥ 20% |
| s2 = 20 to 55% S2 | with | |
| s3 = 40 to 100% S3 | | (s2/S2) − (s1/S1) ≥ 10% |
| c) p1 = 40 to 100% H1 | | (P2/H2) − (P3/H3) ≥ 10% |
| p2 = 20 to 55% H2 | with | |
| p3 = 0 to 35% H3 | | |
| d) A1 = 40 to 100% S1 | | (A2/H2) − (A3/H3) ≥ 10% |
| A2 = 20 to 55% S2 | with | |
| A3 = 0 to 35% S3 | | (A1/H1) − (A2/H2) ≥ 10% | in the case of treads having 7 or 8 circumferential rows of blocks:

| | | |
|---|---|---|
| a) h1 = 0 to 50% H1 | | (h4/H4) − (h3/H3) ≥ 20% |
| h2 = 30 to 60% H2 | with | (h3/H3) − (h2/H2) ≥ 10% |
| h3 = 50 to 80% H3 | | (h2/H2) − (h1/H1) ≥ 5% |
| h4 = 70 to 100% H4 | | |
| b) s1 = 0 to 30% S1 | | (s4/S4) − (s3/S3) ≥ 20% |
| s2 = 10 to 40% S2 | with | (s3/S3) − (s2/S2) ≥ 10% |
| s3 = 20 to 50% S3 | | |
| s4 = 40 to 100% S4 | | (s2/S2) − (s1/S1) ≥ 5% |
| c) P1 = 45 to 100% H1 | | |
| P2 = 30 to 80% H2 | with | (p3/H3) − (p4/H4) ≥ 10% |
| P3 = 15 to 55% H3 | | (p2/H2) − (p3/H3) ≥ 5% |
| P4 = 0 to 30% H4 | | |
| d) A1 = 45 to 100% S1 | | (A3/S3) − (A4/S4) ≥ 10% |
| A2 = 30 to 80% S2 | with | (A2/S2) − (A3/S3) ≥ 10% |
| A3 = 15 to 55% S3 | | (A1/S1) − (A2/S2) ≥ 5% |

-continued

A4 = 0 to 30% S4

A preferred embodiment consists in satisfying, for the two types of cases described above, the following additional condition:

0.85 $H_n < P_n + h_n < 1.15$ $H_n$ and 0.8 $S_n < s_n + A_n < 1.20$ $S_n$

The shape of the platforms provided in the transverse rows may be any whatsoever, although a preferred embodiment consists in the use of platforms which are wider than they are high and the transverse walls of which are connected to the bottom of the grooves by means of a circular arc so as to preserve a water evacuation channel when the tread is already at an advanced stage of wear. In accordance with a variant embodiment, it is possible for the circumferential row or rows of blocks of row n adjacent to the median axis not to have a platform.

The incisions provided in the blocks may be inclined with respect to the normal to the surface of the tread and be of any shape, in particular the bottom of the incisions may or may not be linear. In the case of incisions of irregular shape, in order to determine the depth P of the incision one takes half the sum of the point of minimum depth P, and the point of maximum depth P'', $P = (P' + P'')/2$. The incisions provided in the blocks are to extend from one of the edges of the blocks over at least ¾ of the width of the blocks and preferably debouch on both sides in the circumferential grooves or the edges of the tread. The width of the incisions must be less than 2 mm and preferably not exceed 1 mm. The incisions must be of a general transverse orientation and, in accordance with one preferred embodiment, they are linear, debouch perpendicularly on the two edges of the blocks and are not inclined with respect to the normal to the surface of the tread.

The density of the incisions must be greater in the median row or in the rows located on both sides of and adjacent to the median axis of the tread. The number of incisions may vary and, in accordance with one embodiment, the circumferential rows defining the edges of the tread may be without incisions.

The grooves of generally transverse orientation may be linear or in the form of a broken line.

It has unexpectedly been found that the treads in accordance with the invention, due to the combination of contradictory measures consisting, on the one hand, of connecting the blocks with each other circumferentially by means of platforms of heights increasing from the center towards the edges of the tread and, on the other hand, of increasing the mobility of the rubber of the blocks by means of incisions of suitable area and density, make it possible in a radial-carcass heavy-vehicle tire to obtain a longitudinal rigidity which decreases progressively from the edges towards the center of the tread and to establish heavy-vehicle tires which are excellent for all four seasons of the year, that is to say, have both excellent traction on snow-covered roads and good adherence on wet ground while showing uniform wear of the entire tread, whatever the level of wear.

The invention is described by way of illustration and not of limitation by the example described.

BRIEF DESCRIPTION OF THE DRAWINGS

FIG. 1 shows in plan view a portion of a tread in accordance with the invention and FIG. 1 is another variant embodiment.

DESCRIPTION OF THE PREFERRED EMBODIMENTS

Figure 2:
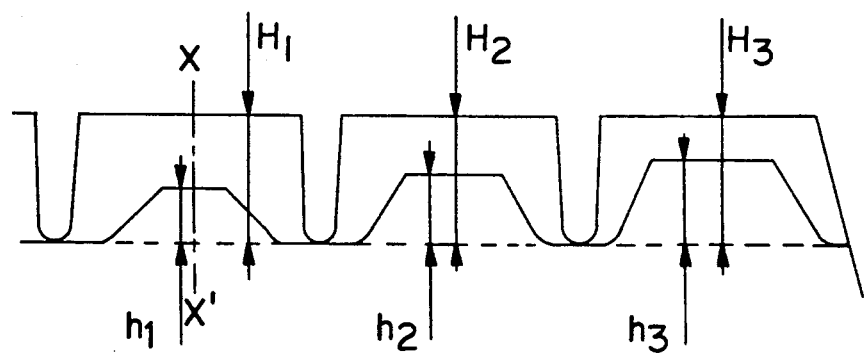
FIG. 2 is a cross section along the line II—II of a portion of the tread of the invention.

The tread shown in FIG. 1 has five broken-line circumferential grooves 10 and broken-line grooves of generally transverse orientation 12 defining six circumferential rows of individual blocks 13.

The two rows located on opposite sides of and in the vicinity of the median axis of row 1 constitute the central zone Z of the tread while the other rows extending towards the edges of the tread are the rows of row 2 and 3.

In the transverse grooves 12, the blocks are connected to each other by rubber platforms 14. The blocks are provided with incisions 15 of generally transverse orientation connecting the circumferential grooves 10.

FIG. 1 bis shows an embodiment in which the tread has four circumferential grooves defining five rows of blocks and the row of blocks located in the center of the tread constitutes the row of row 1 which represents the central zone Z.

FIG. 2 shows in section, in accordance with FIG. 1 bis, a section of platforms arranged in the transverse grooves 12 in each of the circumferential rows of blocks of row n=1, n=2 and n=3.

Figure 3:
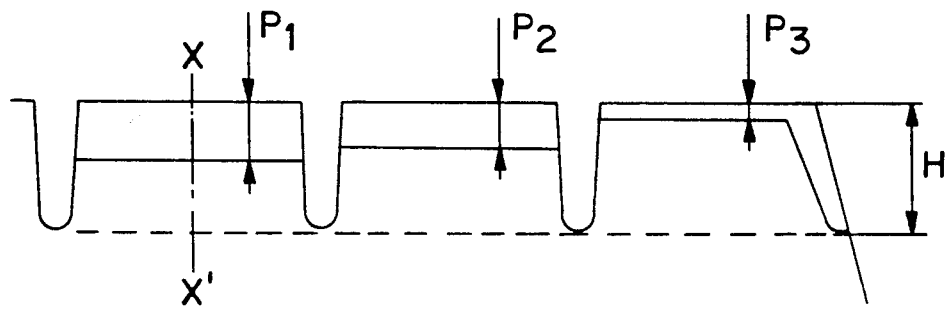
FIG. 3 is a cross section along the line III—III of a portion of the tread of the invention.
Figure 4:
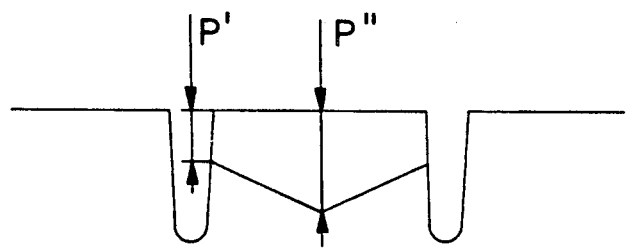
FIG. 4 is a sectional view through an embodiment of an incision not having a linear bottom.

FIG. 3 shows in section, in accordance with FIG. 1 bis, embodiments of incisions 15 present in the rows of blocks, while FIG. 4 shows another possible embodiment of an incision 15.

A comparative test was carried out with inflated tires loaded under rated conditions. A tire of size 295/80 R 22.5 having a tread in accordance with the invention was compared with a control tire having the same construction except that its tread differs from the tread of the invention by the absence of the platforms and of the incisions. The tires were mounted on the drive axle of a bus and subjected to travel on the highway for 80% of the mileage traveled and on wet or snow-covered mountain roads for 20% of the mileage traveled.

After 50,000 km the control tire shows maximum wear on the edges of the tread and, furthermore, general saw-tooth wear of the entire tread, prejudicial to comfort, while the tire in accordance with the invention did not show these two types of wear after 85,000 km, having definitely improved adherence to both wet ground and snow-covered ground.

I claim:

1. A tire tread for heavy vehicles which tire tread, when formed in circular configuration, comprises a plurality of grooves of generally circumferential orientation (10) and a plurality of grooves of generally transverse orientation (12) defining a plurality of circumferential rows of individual blocks (13) connected to each other in the circumferential direction by platforms (4) and some part of which rows are provided with incisions (15), characterized by the fact that from the center of the tread towards the edges, the height of the platforms increases, the depth of the incisions decreases, and the density of the incisions is maximum in the central zone (Z) of the tread and by the fact that the height and the area of the platforms (14) and the depth and the total area of the incisions (15) present in the blocks (13) satisfy all of the following relationships when it has 4 to 5 circumferential grooves:

| | | |
|---|---|---|
| h1 = 0 to 50% H1 | | (h3/H3) − (h2/H2) ≧ 20% |
| h2 = 45 to 75% H2 | with | |
| h3 = 70 to 100% H3 | | (h2/H2) − (h1/H1) ≧ 10% |
| s1 = 0 to 35% S1 | | (s3/S3) − (s2/S2) ≧ 20% |
| s2 = 20 to 55% S2 | with | |
| s3 = 40 to 100% S3 | | (s2/S2) − (s1/S1) ≧ 10% |
| p1 = 40 to 100% H1 | | (P2/H2) − (P3/H3) ≧ 10% |
| p2 = 20 to 55% H2 | with | |
| p3 = 0 to 35% H3 | | |
| A1 = 40 to 100% S1 | | (A2/H2) − (A3/H3) ≧ 10% |
| A2 = 20 to 55% S2 | with | |
| A3 = 0 to 35% S3 | | (A1/H1) − (A2/H2) ≧ 10% | in which h1, h2, h3 represent the respective heights of the platforms present in the circumferential rows of blocks of the row in question, going from the median axis of the tread towards its edges;
H1, H2, H3 represent the heights of the rubber blocks of the tread of the row in question;
s1, s2, s3 represent the areas of the walls of the platforms adjacent to the walls of the blocks defining the transverse grooves of the circumferential rows of the row in question;
S1, S2, S3 represent the area of the walls of the blocks defining the transverse grooves of the circumferential rows of the row in question;
P1, P2, P3 represent the depth of each of the incisions present in each of the blocks of the circumferential rows of the row in question;
A1, A2, A3 represent the total area in each of the blocks of all of the incisions present in the blocks of the circumferential rows of the row in question.

2. A tire tread for heavy vehicles which tire tread, when formed in circular configuration, comprises a plurality of grooves of generally circumferential orientation (10) and a plurality of grooves of generally transverse orientation (12) defining a plurality of circumferential rows of individual blocks (13) connected to each other in the circumferential direction by platforms (14) and some part of which rows are provided with incisions (15), characterized by the fact that from the center of the tread towards the edges, the height of the platforms increases, the depth of the incisions decreases, and the density of the incisions is maximum in the central zone (Z) of the tread and by the fact that the height and the area of the platforms (14) and the depth and the total area of the incisions (15) present in the blocks (13) satisfy all the following relationships when it has 6 or 7 circumferential grooves:

| | | |
|---|---|---|
| h1 = 0 to 50% H1 | | (h4/H4) − (h3/H3) ≧ 20% |
| h2 = 30 to 60% H2 | with | (h3/H3) − (h2/H2) ≧ 10% |
| h3 = 50 to 80% H3 | | (h2/H2) − (h1/H1) ≧ 5% |
| h4 = 60 to 100% H4 | | |
| s1 = 0 to 30% S1 | | (s4/S4) − (s3/S3) ≧ 20% |
| s2 = 10 to 40% S2 | with | (s3/S3) − (s2/S2) ≧ 10% |
| s3 = 20 to 50% S3 | | |
| s4 = 40 to 100% S4 | | (s2/S2) − (s1/S1) ≧ 5% |
| P1 = 45 to 100% H1 | | |
| P2 = 30 to 80% H2 | with | (p3/H3) − (p4/H4) ≧ 10% |
| P3 = 15 to 55% H3 | | (p2/H2) − (p3/H3) ≧ 5% |
| P4 = 0 to 30% H4 | | |
| A1 = 45 to 100% S1 | | (A3/S3) − (A4/S4) ≧ 10% |
| A2 = 30 to 80% S2 | with | (A2/S2) − (A3/S3) ≧ 10% |
| A3 = 15 to 55% S3 | | (A1/S1) − (A2/S2) ≧ 5% |
| A4 = 0 to 30% S4 | | | in which h1, h2, h3, h4 represent the respective height of the platforms present in the circumferential rows of blocks of the row in question, going from the median axis of the tread towards its edges;
H1, H2, H3, H4 represent the height of the rubber blocks of the tread of the row in question;
s1, s2, s3, s4 represent the areas of the walls of the platforms adjacent to the walls of the blocks defining the transverse grooves of the circumferential rows of the row in question;
S1, S2, S3, S4 represent the area of the walls of the blocks defining the transverse grooves of the circumferential rows of the row in question;
P1, P2, P3, P4 represent the depth of each of the incisions present in each of the blocks of the circumferential rows of the row in question;
A1, A2, A3, A4 represent the total area in each of the blocks of all of the incisions present in the blocks of the circumferential rows of the row in question.

3. A tread according to claim 1 or 2 characterized by the fact that the depths of incisions (15) and the heights of the platforms (14) of the row in question satisfy, for each of the circumferential rows of blocks (13), the relationships:

$$0.85\ H_n < P_n + h_n < 1.15\ H_n \text{ and and } 0.8\ S_n < A_n < 1.20\ S_n$$

in which P, h, H, s, S, A have the same meanings as in claims 1 and 2 for the row in question.

4. A tire provided with a tread having a plurality of grooves of generally circumferential orientation (10) and a plurality of grooves of generally transverse orientation (12) defining a plurality of circumferential rows of individual blocks (13) connected together in circumferential direction by platforms (14) and some part of which rows are provided with incisions (15), characterized by the fact that, from the center of the tread towards the edges, the height of the platforms (14) increases and the depth of the incisions (15) decreases, and the density of the incisions (15) is maximum in the central zone of the tread and by the fact that the height and area of the platforms (14) and the depth and total area of the incisions (15) present in the blocks satisfy all of the following relationships when it has 4 to 5 circumferential grooves:

| | | |
|---|---|---|
| h1 = 0 to 50% H1 | | (h3/H3) − (h2/H2) ≧ 20% |
| h2 = 40 to 75% H2 | with | |
| h3 = 70 to 100% H3 | | (h2/H2) − (h1/H1) ≧ 10% |
| s1 = 0 to 35% S1 | | (s3/S3) − (s2/S2) ≧ 20% |
| s2 = 20 to 55% S2 | with | |
| s3 = 40 to 100% S3 | | (s2/S2) − (s1/S1) ≧ 10% |
| p1 = 40 to 100% H1 | | (P2/H2) − (P3/H3) ≧ 10% |
| p2 = 20 to 55% H2 | with | |
| p3 = 0 to 35% H3 | | |
| A1 = 40 to 100% S1 | | (A2/H2) − (A3/H3) ≧ 10% |
| A2 = 20 to 55% S2 | with | |
| A3 = 0 to 35% S3 | | (A1/H1) − (A2/H2) ≧ 10% | in which h1, h2, h3 represent the respective heights of the platforms present in the circumferential rows of blocks of the row in question, going from the median axis of the tread towards its edges;
H1, H2, H3 represent the heights of the rubber blocks of the tread of the row in question;
s1, s2, s3 represent the areas of the walls of the platforms adjacent to the walls of the blocks defining the transverse grooves of the

|   |   |
|---|---|
| S1, S2, S3 | circumferential rows of the row in question; represent the area of the walls of the blocks defining the transverse grooves of the circumferential rows of the row in question; |
| P1, P2, P3 | represent the depth of each of the incisions present in each of the blocks of the circumferential rows of the row in question; |
| A1, A2, A3 | represent the total area in each of the blocks of all of the incisions present in the blocks of the circumferential rows of the row in question. |

5. A tire provided with a tread having a plurality of grooves of generally circumferential orientation (10) and a plurality of grooves of generally transverse orientation (12) defining a plurality of circumferential rows of individual blocks (13) connected together in circumferential direction by platforms (14) and some part of which rows are provided with incisions (15), characterized by the fact that, from the center of the tread towards the edges, the height of the platforms (14) increases and the depth of the incisions (15) decreases, and the density of the incisions (15) is maximum in the central zone of the tread and by the fact that the height and the area of the platforms (14) and the depth and the total area of the incisions (15) present in the blocks (13) satisfy all of the following relationships when it has 6 or 7 circumferential grooves:

| | | |
|---|---|---|
| h1 = 0 to 50% H1 | | (h4/H4) − (h3/H3) ≧ 20% |
| h2 = 30 to 60% H2 | with | (h3/H3) − (h2/H2) ≧ 10% |
| h3 = 50 to 80% H3 | | (h2/H2) − (h1/H1) ≧ 5% |
| h4 = 70 to 100% H4 | | |
| s1 = 0 to 30% S1 | | (s4/S4) − (s3/S3) ≧ 20% |
| s2 = 10 to 40% S2 | with | (s3/S3) − (s2/S2) ≧ 10% |
| s3 = 20 to 50% S3 | | |
| s4 = 40 to 100% S4 | | (s2/S2) − (s1/S1) ≧ 5% |
| P1 = 45 to 100% H1 | | |
| P2 = 30 to 80% H2 | with | (p3/H3) − (p4/H4) ≧ 10% |
| P3 = 15 to 55% H3 | | (p2/H2) − (p3/H3) ≧ 5% |
| P4 = 0 to 30% H4 | | |
| A1 = 45 to 100% S1 | | (A3/S3) − (A4/S4) ≧ 10% |
| A2 = 30 to 80% S2 | with | (A2/S2) − (A3/S3) ≧ 10% |
| A3 = 15 to 55% S3 | | (A1/S1) − (A2/S2) ≧ 5% |
| A4 = 0 to 30% S4 | | | in which

|   |   |
|---|---|
| h1, h2, h3, h4 | represent the respective height of the platforms present in the circumferential rows of blocks of the row in question, going from the median axis of the tread towards its edges; |
| H1, H2, H3, H4 | represent the height of the rubber blocks of the tread of the row in question; |
| s1, s2, s3, s4 | represent the areas of the walls of the platforms adjacent to the walls of the blocks defining the transverse grooves of the circumferential rows of the row in question; |
| S1, S2, S3, S4 | represent the area of the walls of the blocks defining the transverse grooves of the circumferential rows of the row in question; |
| P1, P2, P3, P4 | represent the depth of each of the incisions present in each of the blocks of the circumferential rows of the row in question; |
| A1, A2, A3, A4 | represent the total area in each of the blocks of all of the incisions present in the blocks of the circumferential rows of the row in question. |

6. A tire according to claim 4 or 5, characterized by the fact that the depths of incisions (15) and the heights of the platforms (14) of the row in question satisfy, for each of the circumferential rows or blocks (13), the relationships:

$$0.85\ H_n < P_n + h_n < 1.15\ H_n \text{ and } 0.8\ S_n < s_n + A_n < 1.20\ S_n \text{ in}$$

which R, h, H, s, S, A have the same meanings as in claims 2 and 3 for the row in question.

* * * * *

UNITED STATES PATENT AND TRADEMARK OFFICE
CERTIFICATE OF CORRECTION

PATENT NO. : 5,316,062

DATED : May 31, 1994

INVENTOR(S) : Patrick Lurois

It is certified that error appears in the above-indentified patent and that said Letters Patent is hereby corrected as shown below:

Item 73, 3rd line, "Ferrand" should read --Clermont-Ferrand--;

Col. 3, line 29, "depth P, " should read --depth P' --;

Col. 4, line 4, "is" should read --bis--;

Col. 4, line 65, "(4)" should read --(14)--;

Col. 6, lines 15-18, the text "present in the blocks of the circumferential rows of the row in question." should follow immediately after the word "incisions" in line 15;

Col. 6, lines 25-26, "$0.85 H_n < P_n + h_n < 1.15 H_n$ and and $0.8 S_n < A_n < 1.20 S_n$" should read --$0.85 H_n < P_n + h_n < 1.15 H_n$ and $0.8 S_n < S_n + A_n < 1.20 S_n$--;

Col. 8, lines 36-38, "in" should be transferred from the end of line 36 to the beginning of line 38;

UNITED STATES PATENT AND TRADEMARK OFFICE
CERTIFICATE OF CORRECTION

PATENT NO. : 5,316,062
DATED : May 31, 1994
INVENTOR(S) : Patrick Lurois

It is certified that error appears in the above-indentified patent and that said Letters Patent is hereby corrected as shown below:

Col. 8, line 38, "R" should read --P--;

Signed and Sealed this

Twenty-second Day of November, 1994

Attest:

BRUCE LEHMAN

*Attesting Officer*    Commissioner of Patents and Trademarks

UNITED STATES PATENT AND TRADEMARK OFFICE
CERTIFICATE OF CORRECTION

PATENT NO. : 5,316,062

DATED : May 31, 1994

INVENTOR(S) : Patrick Lurois

It is certified that error appears in the above-indentified patent and that said Letters Patent is hereby corrected as shown below:

On the title page item [73], 3rd line, "Ferrand" should read --Clermont-Ferrand--;

Col. 3, line 29, "depth $\dot{P}$," should read --depth $P'$ --;

Col. 4, line 4, "is" should read --bis--;

Col. 4, line 65, "(4)" should read --(14)--;

Col. 6, lines 15-18, the text "present in the blocks of the circumferential rows of the row in question." should follow immediately after the word "incisions" in line 15;

Col. 6, lines 25-26, "0.85 $H_n$ < $P_n$ + $h_n$ < 1.15 $H_n$ and and 0.8 $S_n$ < $A_n$ < 1.20 $S_n$" should read --0.85 $H_n$ < $P_n$ + $h_n$ < 1.15 $H_n$ and 0.8 $S_n$ < $S_n$ + $A_n$ < 1.20 $S_n$--;

UNITED STATES PATENT AND TRADEMARK OFFICE
CERTIFICATE OF CORRECTION

PATENT NO. : 5,316,062
DATED : May 31, 1994
INVENTOR(S) : Patrick Lurois

It is certified that error appears in the above-indentified patent and that said Letters Patent is hereby corrected as shown below:

```
Col. 8, lines 36-38, "in" should be transferred from the
end of line 36 to the beginning of line 38;

Col. 8, line 38, "R" should read --P--; and

Col. 8, line 39, "claims 2 and 3" should read --claims 1
and 2--.
```

This certificate supersedes Certificate of Correction issued ( November 22, 1994 ).

Signed and Sealed this

Tenth Day of January, 1995

Attest:

BRUCE LEHMAN

Attesting Officer

Commissioner of Patents and Trademarks